June 10, 1930.  A. L. BAUSMAN  1,763,085
APPARATUS FOR FORMING CONFECTION SHELLS
Filed Feb. 9, 1928  3 Sheets-Sheet 1
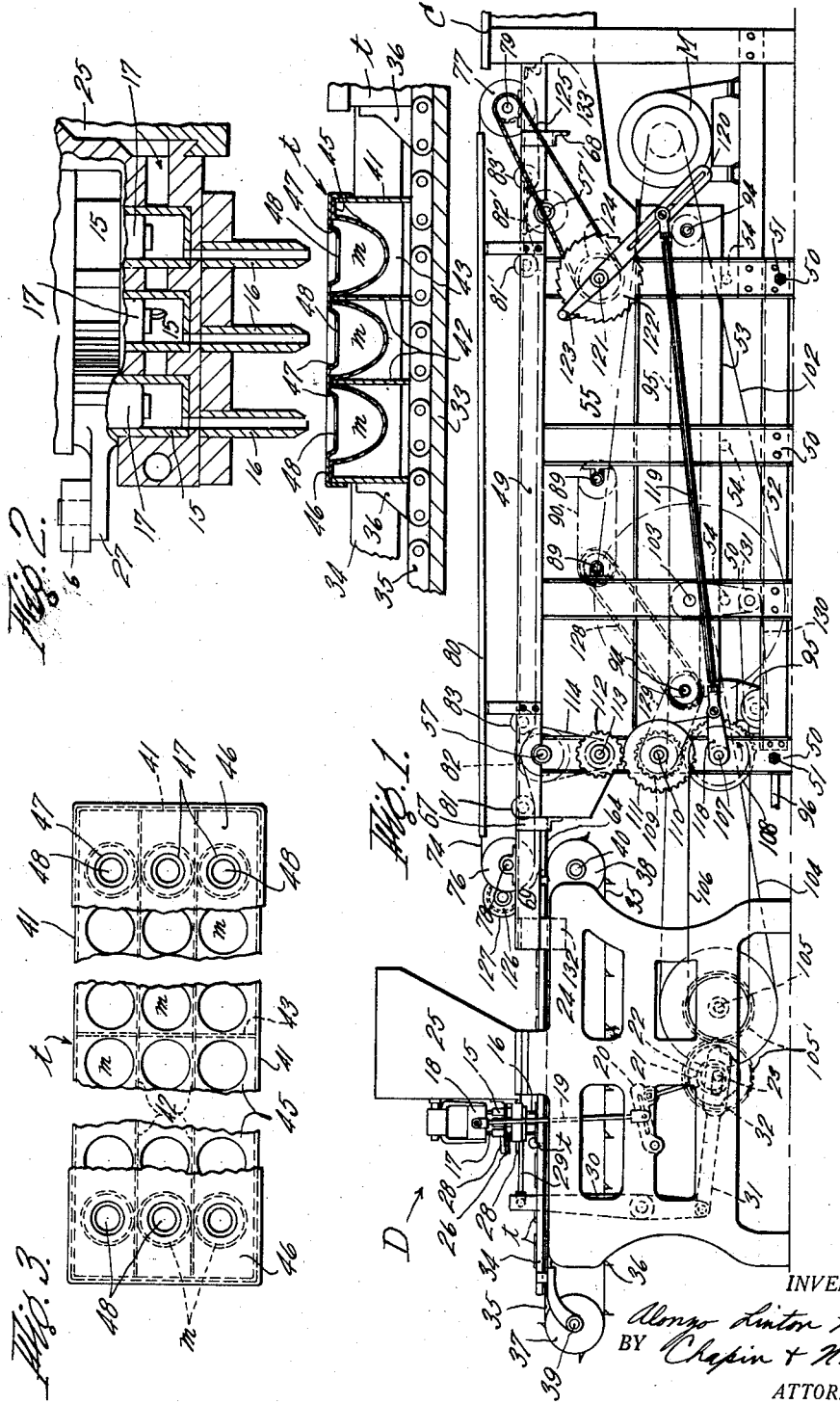
INVENTOR.
Alonzo Linton Bausman
BY Chapin + Neal
ATTORNEYS.

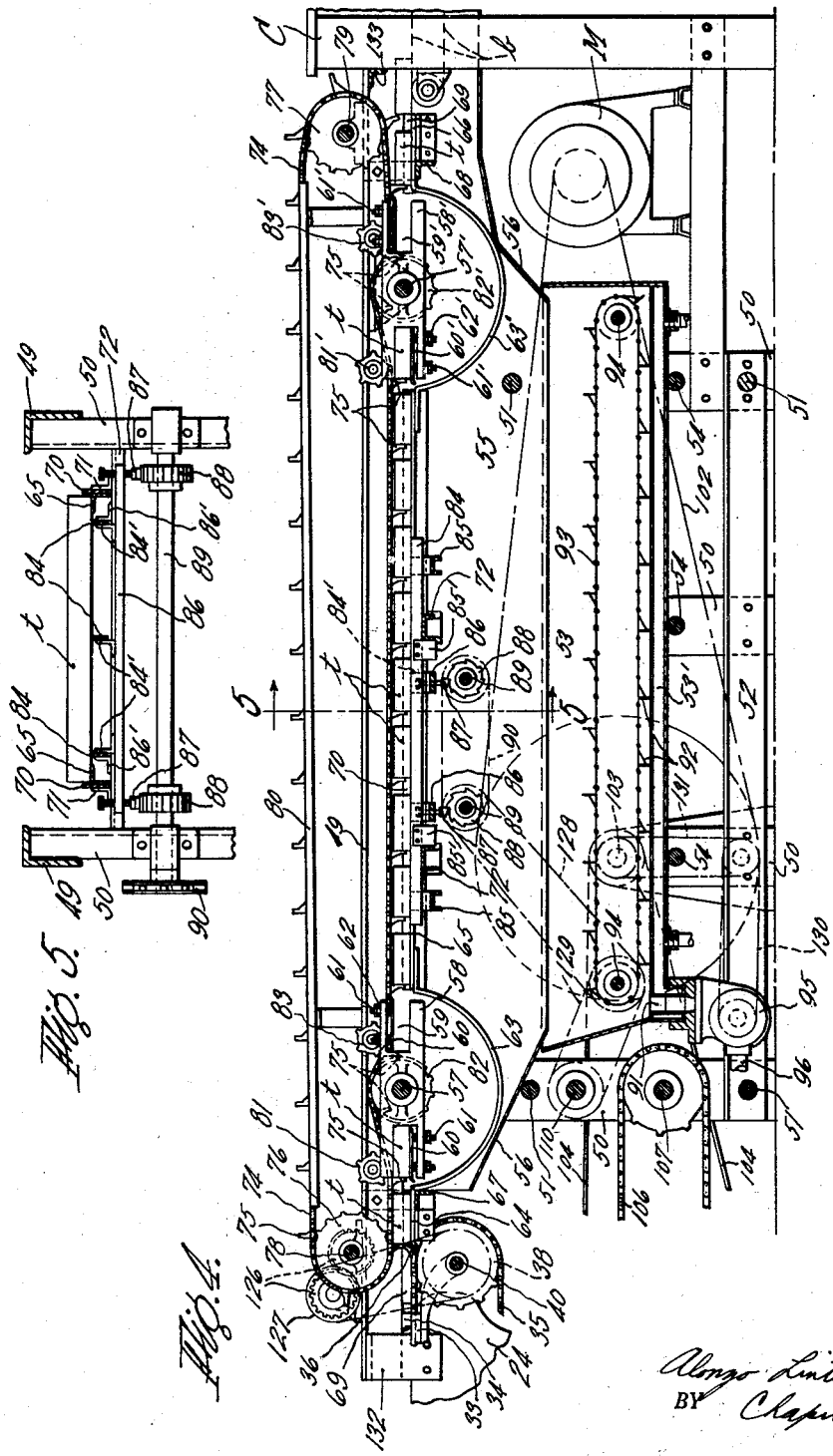

June 10, 1930.  A. L. BAUSMAN  1,763,085
APPARATUS FOR FORMING CONFECTION SHELLS
Filed Feb. 9, 1928   3 Sheets-Sheet 3
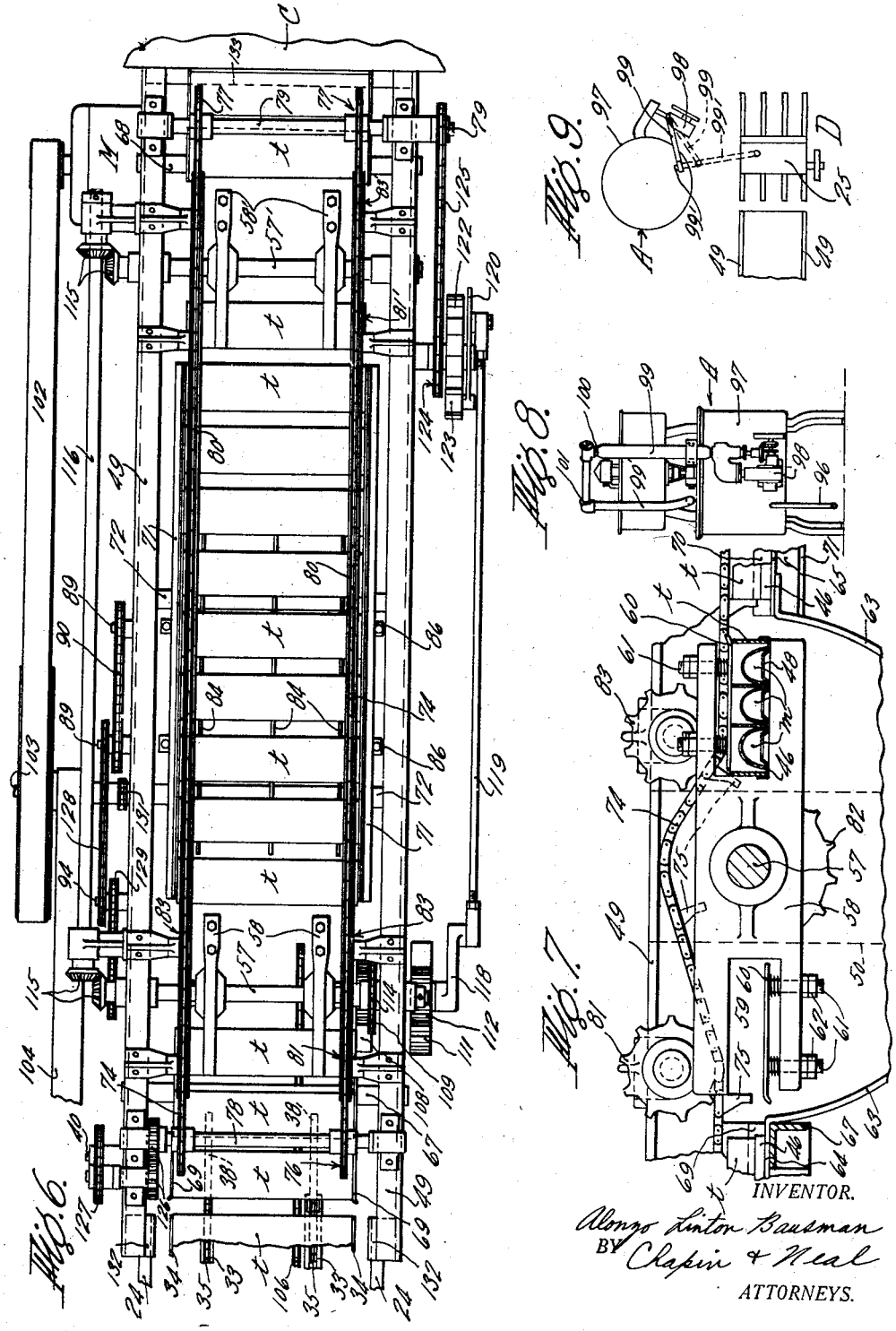
INVENTOR.
Alonzo Linton Bausman
BY Chapin & Neal
ATTORNEYS.

Patented June 10, 1930

1,763,085

UNITED STATES PATENT OFFICE

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS

APPARATUS FOR FORMING CONFECTION SHELLS

Application filed February 9, 1928. Serial No. 253,176.

This invention relates to improvements in apparatus for forming shells from suitable confection material, such as chocolate or the like, for example.

The general method employed for making these chocolate shells is to fill a mold with chocolate; turn the mold upside down, whereby part of the chocolate will drain from the mold leaving an open ended shell formed by those portions of the chocolate which adhere to the walls of the mold; and finally to turn the mold right side up and pass it into a cold box for the purpose of hardening the shells. The finished shells, thus formed, may be subsequently filled with any suitable centers and the open ends of the shells closed by a layer of chocolate. All these steps are to be found in the prior art, as for example, in my prior Patent No. 1,276,006, granted August 20, 1918 or in Boyd Patents No. 1,138,929 and No. 1,200,705, dated May 11, 1915 and October 16, 1916, respectively.

The present invention is concerned only with the formation of the open ended chocolate shells and is directed to an improved apparatus for doing this kind of work.

One object of the invention is to provide an improved draining unit, comprising a device for successively receiving molds, which have been filled with chocolate, and for turning them upside down; conveying means for moving the inverted molds while they are draining, means for shaking the molds during the draining operation, and a device which finally receives the drained molds and turns them right side up.

The aforesaid unit may be interposed between any suitable mold filling means and any suitable cooling means or, if the cooling step is not desired, the molds from the draining unit may be delivered directly into an apparatus for depositing centers in the shells which have been formed in the molds.

As a matter of preference, a depositor is utilized as the mold filling machine and, preferably, this depositor is arranged with several rows of nozzles so that all of the rows of molds in one tray can be simultaneously filled.

Utilizing this type of depositor, I am enabled very simply yet effectively to synchronize the tray or mold feeding means of the depositor with the corresponding means of the draining unit,—each feeding means being arranged to move the trays by equal steps so that the two means may be readily tied together and driven from a single mechanism.

Another object of the invention is to provide improved devices for turning the molds and a conveying means, which is characterized in that it moves the molds into and out of both of the turn over devices and conveys them from one device to the other.

Another feature of the invention consists in an arrangement whereby all of the chocolate which drains or is shaken from the molds, is collected and returned to a suitable point to be used over again.

By preference, I provide a conditioning apparatus located adjacent the depositor, from which apparatus chocolate is taken to supply the depositor, and the chocolate collected as above described, is returned to this apparatus to be reconditioned.

Other objects and features will appear from the following description and will be pointed out in the appended claims.

The invention will be disclosed with reference to the accompanying drawings, in which:—

Fig. 1 is a side elevational view showing the mold filling apparatus, the draining unit and the receiving end of a cold box;

Fig. 2 is a sectional elevational view, drawn to a larger scale, and illustrating the mold filling means and the mold construction;

Fig. 3 is a top plan view of one of the trays which contains the molds;

Fig. 4 is a sectional elevational view of the draining unit;

Fig. 5 is a fragmentary cross sectional view taken on the line 5—5 of Fig. 4 and showing the tray rapping mechanism;

Fig. 6 is a top plan view of the draining unit;

Fig. 7 is a fragmentary sectional elevational view drawn to a larger scale, showing in detail one of the turn over devices after a mold tray has been inverted thereby;

Fig. 8 is an elevational view of the conditioning apparatus; and

Fig. 9 is a top plan view showing the disposition of the conditioning apparatus relatively to the depositor.

Referring to these drawings; the mold filling apparatus comprises a standard depositor D (Fig. 1) which is of a well known type except that it is provided with three rows of pump cylinders 15 (best shown in Fig. 2) and a corresponding number of rows of nozzles 16. Measured charges of the chocolate are ejected from these nozzles by means of pistons 17, having piston rods 17'. These piston rods, which are all connected to a common slide 18, are reciprocated in the usual or any suitable manner, as by links 19 connecting the slide to levers 20 which in turn are connected to eccentric straps 21, cooperating with eccentrics 22 fixed to a shaft 23, mounted in the side frames 24 of the depositor. These side frames support the supply hopper 25 from which the pumps on their upward strokes draw in measured charges of chocolate.

Any suitable valve arrangement may be provided, whereby the pump cylinders can be connected to the hopper 25 while the pistons 17 move upwardly and whereby they can be connected to the nozzles 16 while the pistons 17 move downwardly. The valve arrangement illustrated is substantially like that disclosed in Carlson Patent No. 712,649, granted November 4, 1902, except that three rows of pump cylinders are used instead of the two rows shown in the patent. The valve arrangement, as shown in this patent, contemplates the use of the cylinders as valves and the several cylinders are arranged to simultaneously turn about their axes. The two rows of cylinders are geared together and in the present case what has been done is to add an extra row of cylinders and gear them to the cylinders of the adjacent row. The arrangement is otherwise like that of the Carlson patent and, in the drawings, 26 represents the cross link to which each cylinder of the rear row is connected by an arm 27. Link 26 is reciprocated in a transverse path by suitable mechanism operated from shaft 23. A bellcrank 28 connects link 26 to a link 29 which in turn is connected to the upper end of a lever 30. The lower end of lever 30 is connected to a link 31, which is reciprocated by a cam 32 fixed on shaft 23.

The depositor is provided with suitable runways 33 on which the mold trays $t$ are supported and on which they slide, and side guides 34, which serve to hold the molds against undue sidewise displacement. The trays $t$ are moved by a pair of conveyer chains 35 each having a series of mold tray engaging lugs 36. Chains 35 are trained between pairs of sprockets 37 and 38, fixed to shafts 39 and 40, rotatably supported from the side frames 24 of the depositor. These chains are intermittently operated, by means later to be described, and are arranged to move the trays $t$ by steps a little greater than their length. As the chains come to rest, a tray is positioned beneath the nozzles 16 so that the three rows of molds in the tray lie vertically below the three rows of nozzles (Fig. 2). The pump mechanism, which functions while chains are at rest, thus simultaneously fills all the molds in the tray.

The present invention is independent of the character of the mold tray used. I have, however, chosen as an illustrative example, a mold of a particular type which demonstrates the need for the shaking mechanism, later to be described. The tray $t$ (Fig. 3) comprises a hollow rectangular frame 41 with transverse and longitudinal dividing bars 42 and 43, respectively. The several rows of mold recesses $m$ are formed as depressions in a single sheet of metal 45 which lies on top of and is suitably secured to the skeleton frame above described. A flanged cover 46 rests on top of the mold sheet 45 and the flanges of the cover engage the sides and ends of the skeleton frame, whereby the cover is held properly located with respect to the molds. This cover has three rows of depressed portions 47 which enter the upper parts of the mold recesses $m$ and in each depressed part is a hole 48, through which chocolate is supplied to the mold recess. Each hole 48 is of less diameter than the upper part of the mold recess. Thus, when the molds are inverted for the draining operation, the holes 48, which form restricted outlets, retard the draining operation and, more than that, they cause more of the chocolate to remain in the molds than is necessary or desirable for the formation of the shells. Important advantages are derived from the use of this mold construction, which advantages more than offset the disadvantage just set forth and the difficulty experienced with this type of mold is overcome by means later to be described.

The draining unit includes a suitable framework which as shown herein, includes two laterally-spaced and longitudinally disposed angle irons 49 (Fig. 6), each supported by a series, as four, of channel iron uprights 50 (Fig. 1). The several uprights are suitably tied together transversely, as by tie rods 51 and they are also tied together longitudinally, near their lower ends by angle irons 52. Between the pairs of uprights and located near the lower ends thereof is a tank 53, preferably provided with a heating jacket 53'. This tank is supported by a series of cross rods 54, each of which spans the space between a pair of uprights and is suitably supported at its ends therefrom. Side plates 55, secured to the uprights 50, close in the space between the top angle irons 49 and tank 53. These side plates project beyond each end of tank 53 and the projecting portions are connected together to provide sloping floors 56 which serve to direct the chocolate into tank 53.

Mounted in the frame, just described, are two cross shafts 57 and 57' one near each end of the frame. Each of these shafts carries and operates a turn-over device. That on shaft 57 serves to turn the trays t upside down and that on shaft 57' serves to right the trays after the molds m have drained. Each turn-over device is of similar construction, wherefore one only will be described and corresponding parts of the other will be given the same reference numerals with the addition of a prime. The turn-over device consists of two or more members 58 (Fig. 6) fixed in axially spaced relation to shaft 57. The shaft passes centrally through member 58 (Fig. 7) and in opposite ends of the latter are formed open ended pockets 59 designed to receive the mold tray t. One wall of each pocket has a spring pressed jaw 60, fixed to studs 61 which are slidable in member 58 and provided with nuts 62 which limit the inward movement of the jaw. The arrangement is such that when a tray t is pushed into a pocket 59, the jaw 60 will be moved outwardly slightly and stress the springs so that the mold will be firmly held in place. The two members 58 serve to receive two trays t, one on each side of shaft 57, and each mold is held at transversely spaced points by the two members. A semi-circular guard 63 (Fig. 4) serves to prevent the molds from sliding radially out of their pockets while the members 58 are being turned. These members when at rest, lie horizontally as shown, and are intermittently moved by increments of 180 degrees.

The lower walls of pockets 59, when members 58 are at rest, aline with trackways 64, 65 and 66 (Fig. 4). The short trackways 64 and 66 are formed by horizontally bent ends of the guards 63 and 63', respectively. The trackways 64 serve to support the trays while they are being moved into the left hand pockets of the first turn-over device and the trackways 66 serve to support the trays after they have been moved out of the right hand pockets of the second turn-over device. The trackways 65 extend between the two turn-over devices and serve to support the trays t while being moved from one device to another and during the draining operation. The trackways 64 and 66 are supported by transverse angle irons 67 and 68, the ends of which are upturned and secured to angle irons 49. These trackways also have connected thereto upright side guides 69. The trackways 65 (Fig. 5) consist of angle irons to which are connected side guides 70. The latter are connected by angle irons 71 to a pair of transversely disposed channel irons 72 (Fig. 4), which extend between pairs of the channel uprights and are supported at their ends therefrom. The trackways 64 receive the trays from the depositor and the trackways 66 extend to a cold box C of any suitable form.

The trays are fed into and out of both turn over devices by a single conveying means, comprising a pair of chains 74 having tray engaging lugs 75. These chains are trained between pairs of sprockets 76 and 77 fixed to shafts 78 and 79 which are rotatably supported, as indicated, from the angle irons 49. The upper lap of chains 74 is supported by runways 80, which are supported, as indicated from angle irons 49. The lower lap of these chains overlies the molds so that by no possibility can chocolate from the molds lodge on the chains. The lower lap of each chain is guided with reference to the first turn-over device by three idler sprockets 81, 82 and 83 (best shown in Fig. 7). The sprockets 82 are mounted to turn freely on shafts 57. These sprockets guide their chain up over the shaft 57 and back down again, so that the lugs 75 will clear the shaft and then be carried back into position to move a tray out of the right hand pocket 59. The chains are similarly directed with reference to the right hand turn-over device and corresponding parts have been given the same reference numerals with the addition of a prime.

The chains 74 move while the turn-over devices are at rest. A pair of chain lugs 75 will pick up and move a tray just as the lugs 36 of the depositor chains 35 move out of engagement therewith (Fig. 4). The tray is then advanced step by step until it is moved radially into the left hand pockets 59 of the left hand turn-over device and the chains come to rest just when the tray has been fully moved into such pockets. As a tray is being pushed into the left hand pockets, the same chains operate to move a tray which has been previously inverted by the left hand turn-over device, out of the right hand pockets thereof. Therefore, when this turn-over device is rotated 180 degrees to invert the tray just fed into it, an empty pair of pockets will be brought into tray-receiving relation with trackways 64 as shown in Fig. 7. Also, that pair of lugs 75, which pushed the tray into the left hand pockets of the left hand turn-over device, can advance on the next step without interference and on the next succeeding step this same set of lugs will move into position to remove a tray from the right hand pockets, as will be clear from Fig. 7. The chains also serve to move the trays step by step along the trackways 65 and successively into the left hand pockets of the right hand turn-over device. The chains 74 function with this device in a manner similar to that just described. The trays, when moved out of the right hand turn-over device are then carried toward the cold box C,—the lugs 75 being gradually disengaged therefrom because the chains 74, as they approach the sprockets 77 rise enough for this purpose. The trays are delivered upon the cold box conveyer belt $b$.

As the trays $t$ are moved step by step between the two turn-over devices, their molds $m$ are upside down and chocolate drains therefrom through the restricted outlets 48. To facilitate the removal of excess chocolate from the molds, they are periodically shaken. This is accomplished by a rapper frame comprising three longitudinally disposed and transversely spaced bars 84 (Fig. 5) which are set on edge. These several bars are tied together transversely by channel irons 85 (Fig. 4) and by a pair of cross bars 86 located between the channels. The connection of each bar 84 to cross bar 86 is made by a short angle iron 84' and the connection of bars 84 to channels 85 is similarly made. Short angle irons 86' are fastened to each channel 72, one adjacent and outside of each outer rapper bar 84, whereby the rapper frame is held against transverse displacement. A pair of depending members 85' (Fig. 4) are secured in longitudinally spaced relation to the rapper bars 84 and are arranged one adjacent each cross channel 72 for the purpose of preventing longitudinal displacement of the rapper frame. Each cross bar 86 near each end has adjustably mounted therein a pawl 87 and each of these four pawls rests upon a ratchet 88. The four ratchets are mounted in pairs on two shafts 89 which are connected together by a chain 90 to turn in unison. These ratchets are arranged to turn intermittently and while chains 74 are at rest. Thus, each time a tray comes to rest it is subjected to a rapping action by the bars 84, which repeatedly raise the tray from its track-ways 65 and allow it to drop back thereupon. In this way, much more of the chocolate can be removed from the molds than could be if draining alone were relied upon. This shaking action is especially desirable with molds of a class similar to that described which have restricted outlets. With molds having unrestricted outlets, the shaking action can in many cases be dispensed with.

The chocolate removed from the molds falls to the floor of tank 53. At one end of this tank is a sump 91 and chocolate is moved from the other end of the tank toward and into this sump by a series of scrapers 92 mounted on a pair of conveyer chains 93. These chains are trained over suitable sprockets fixed in pairs to a pair of shafts 94. These shafts have bearings in the side walls of tank 53 and also pass through the channel uprights 50, whereby the tank is held against longitudinal displacement. The outlet of sump 91 delivers into a pump 95 which forces the chocolate, collected from tank 53, through a pipe 96 to any suitable point.

As herein shown, pipe 96 leads to the conditioning apparatus designated as a whole by A in Fig. 8. This apparatus includes a kettle 97 in which the chocolate is kept properly heated and stirred. It also includes a pump 98 and a discharge pipe 99 therefor. Pipe 99 is swivelled at 100 and 101. The outlet end 99' of pipe 99 is normally so positioned as to deliver chocolate back into the top of kettle 97. The chocolate is taken from the base of the kettle, forced through pipe 99 by the pump and delivered into the top of the kettle. When, however, it is desired to replenish the supply hopper 25 of the depositor the outlet end 99' of the discharge pipe 99 is swung upwardly and also turned until it overlies the supply hopper, as indicated in dotted lines in Fig. 9.

Referring to the driving mechanism, a motor M (Figs. 1, 4 and 6), drives by a belt 102 a jackshaft 103 mounted in the frame of the draining unit. This jackshaft drives by a belt 104 (Figs. 1 and 4) the drive shaft 105 of the depositor. Shaft 105 drives by spur gears 105' (Fig. 1) the shaft 23 above described, from which the pumps and pump valves of the depositing mechanism are operated. Shaft 105 also drives by a chain 106 a shaft 107 mounted in the left hand pair of uprights of the draining unit. Shaft 107 carries a large intermittent gear 108 which during one half revolution causes a complete revolution of a smaller mating gear 109 fixed to a shaft 110. On the latter is fixed a large intermittent gear 111 which during one half revolution causes one complete revolution of a smaller gear 112 fixed to a shaft 113. The latter is connected by a chain 114 and suitable sprockets to the shaft 57 of the left hand turn-over device in such a way that one revolution of gear 112 causes one half a revolution of shaft 57. Shafts 57 and 57' are connected by bevel gears 115 (Fig. 6) to a longitudinally disposed shaft 116 mounted alongside but outside of one of the angle irons 49 and suitably supported therefrom. The shafts 110 and 113 are suitably supported in one of the left hand pair of uprights 50. The two turn-over devices, being interconnected as described, are operated simultaneously, and due to the arrangement of two sets of intermittent gears in the driving connections from shaft 107, they turn through one half revolution while shaft 107 is making one quarter of a revolution. This allows for a dwell of the turn-over devices during one quarter of a revolution of shaft 107. The turn-over devices start to turn immediately that gear 108 starts to turn gear 109 but they come to rest after gear 108 has made a quarter turn. This arrangement provides for the desired speedy operation of the left hand turn-over device so that the molds will be inverted as quickly to avoid so far as possible spilling of chocolate while the molds are turning. It also provides a substantial dwell of the inverted tray in the turn-over device, which dwell permits partial draining of the mold.

The shaft 107 which thus drives the turn over devices during part of one half revolution thereof, also serves to drive the several conveyer chains. To this end, the shaft carries a crank 118 (Figs. 1 and 6) which by a link 119 drives a lever 120 pivoted intermediate its ends on a stud 121 fixed to one of the right hand pair of uprights 50. Rotatable on stud 121 is a ratchet 122 adapted to be turned by a pawl 123 carried by the upper end of lever 120. Fixed to ratchet 122 is a sprocket 124 which drives by a chain 125 the shaft 79 which drives the above described chains 74. As will be obvious from Fig. 1, pawl 123 moves idly over the ratchet while the intermittent gears are driving the turn-over devices and advances the ratchet only when gear 108 moves idly with reference to gear 109. The conveyer chains 74 drive the depositor conveyer chains 35 by means of a pair of spur gears 126 (Figs. 4 and 6) and a chain 127,—the spur gears serving as a reversing device so that the lower lap of chains 74 and the upper lap of chains 35 will move in the same direction.

One of the shafts 89 of the rapping mechanism is connected by a chain 128 (Figs. 4 and 6) to one of the shafts 94 of the scraper conveyer in tank 53 and the last named shaft is connected by a chain 129 (Figs. 4 and 6) to the shaft 110 in the chain of driving connections for the turn-over devices. Thus, both the rapping mechanism and the chocolate collecting means in tank 53 operate intermittently and while the tray conveyers are at rest. The pump 95 is driven by chains 130 and 131 from the jackshaft 103.

The frame of the draining unit is suitably tied to the frame of the depositor and to the cold box. For example, each side frame 24 of the depositor is connected to the overlying angle iron 49 by an angle iron 132. The two angle irons 49 are connected together at their right hand ends by a transverse angle iron 133 which is secured to the adjacent end of cold box C.

In operation, the trays $t$ with the covers 46 in place thereon, are placed by hand or otherwise on the depositor chains 35, which by means of the lugs 36 successively advance the trays step by step until they come to a position such that the lugs 75 of the chains 74 of the draining apparatus can move them. Each time the chains 35 come to rest a tray $t$ is brought into the position shown in Fig. 2 so that each of three transverse rows of molds therein underlies a row of depositor nozzles. The depositing mechanism acts during an interval of rest of chains 35 to simultaneously fill with chocolate all of the molds $m$ in a tray $t$. The trays containing the filled molds are then advanced step by step until they reach and are successively inserted in the pockets 59 of the left hand turn-over device 58. The latter, during each interval of rest of chains 74, functions to quickly invert the tray placed in it, bringing the tray from the position shown in Fig. 4 to that shown in Fig. 7, in which draining of chocolate from molds $m$ commences. On the next succeeding operation of chains 74, the inverted tray is moved out of the left hand turn-over device and onto trackways 65. The trays then advance step by step along these trackways and the draining of the molds continues. After the preliminary draining of the molds, they are then subjected to several successive rapping actions by bars 84 which shakes out of the small holes 48 of the cover 46 of the mold trays, still more chocolate which, while plastic, would not otherwise flow out.

The molds need not necessarily be chilled before being fed to the depositor. If they are at ordinary room temperature, there will be a sufficient heat exchange between the chocolate and molds to cause the chocolate to solidify adjacent the walls of the mold. Ordinarily, the chocolate will solidify enough for the formation of the shells without using any special cooling means for there is a substantial interval between the time when the molds are filled and the time when they are inverted. Thus, the draining action and the rapping action remove only part of the chocolate from the molds and shells of chocolate are left in the molds to be later filled with suitable centers and sealed. The trays, after having been drained and rapped, are successively fed into the right hand turn-over device 58′, which operates simultaneously with device 58 and functions to turn the trays right side up again. The chains 74 move the righted trays out of the device 58′ and convey them to the conveyer belt $b$ of cold box C, which latter serves to completely set the chocolate shells. All the chocolate removed from molds $m$ falls on the heated floor of tank 53 and is conveyed by scrapers 92 to pump 95 which returns it to the conditioning apparatus A. Here the chocolate is again conditioned for use and the reconditioned chocolate can be pumped from the apparatus A into the supply hopper 25 of the depositor by pump 98 and pipes 99 and 99'.

The invention has been disclosed herein, in an embodiment at present preferred, for illustrative purposes but the scope of the invention is defined by the appended claims rather than by the foregoing description.

What I claim is:

1. In an apparatus of the class described, a mold turning device comprising, a member mounted for intermittent turning movement about an axis disposed intermediate the ends thereof and provided at each end with a mold receiving recess, a flexible conveyer element mounted to travel in a plane spaced from but parallel with the plane in which said member turns and having a series of lugs for moving the molds, guiding means to direct said element so that one lug will move a mold into one of said recesses while another lug moves another mold out of the other recess, and means for operating said element during intervals of rest of said member.

2. In an apparatus of the class described, a mold turning device comprising, a member mounted for intermittent turning movement about an axis disposed intermediate the ends thereof and provided at each end with a mold receiving recess, a supporting shaft for said member, a flexible conveyer element mounted to travel in a plane spaced from but parallel with the plane in which said member turns and having a series of lugs for moving the molds, guiding means to direct said element so that one lug will move a mold into one of said recesses while another lug moves another mold out of the other recess, and so that said lugs will be deflected in a non-interfering path with respect to said shaft, and means for operating said element during intervals of rest of said member.

3. In an apparatus of the class described, a mold turning member mounted to turn intermittently by increments of 180 degrees, a shaft connected with said member at a point intermediate its ends, said member having in diametrically opposed ends pockets to receive molds, an intermittently operable conveyer element movable while said member is at rest and having a series of lugs each of which in turn moves a mold into one of said pockets and later moves a mold out of the pocket on the opposite side of said shaft, and guiding means for deflecting said element so that each lug can move from the first to the second position without interference with said shaft.

4. In an apparatus of the class described, mold supporting trackways the delivery end of one being spaced from the receiving end of the other, a mold turning member mounted for intermittent turning movement in the gap between said trackways and having substantially diametrically opposed mold receiving pockets therein, one of which when said member is at rest alines with the delivery end of one of said trackways and the other of which alines with the receiving end of the other trackway, and a flexible conveyer element mounted entirely above the path of travel of the molds and having devices depending into said path to engage the molds and move them along said trackways, said element being intermittently operable while said member is at rest and so that one of said devices moves one mold from one trackway into one of said pockets and another moves a mold from the other pocket onto the other trackway.

5. In an apparatus of the class described, mold supporting trackways the delivery end of one being spaced from the receiving end of the other, a mold turning member mounted for intermittent turning movement in the gap between said trackways and having substantially diametrically opposed mold receiving pockets therein, one of which when said member is at rest alines with the delivery end of one of said trackways and the other of which alines with the receiving end of the other trackway, a supporting shaft for said member connected therewith at a point centrally between said pockets, a flexible conveyer element mounted entirely above the path of travel of the molds on said trackways and having devices depending into said path to engage the molds and move them along said trackways, said element being intermittently operable while said member is at rest and so that one of said devices moves one mold from one trackway into one of said pockets and another moves a mold from the other pocket onto the other trackway, and guiding means for said element for successively deflecting said devices out of said path as they pass from one end of said member to the other.

6. In an apparatus of the class described, a turn-over device into which molds are fed and by which the molds are turned upside down, a second turn-over device into which the inverted molds are fed and by which such molds are turned right side up, and a single endless conveying element constructed to simultaneously engage and move a plurality of molds and arranged to simultaneously move one mold into the first turn-over device, another mold out of the first turn-over device, another mold into the second turn-over device and another mold out of the second turn-over device.

In testimony whereof I have affixed my signature.

ALONZO LINTON BAUSMAN.